United States Patent
Peterson

(10) Patent No.: US 7,122,784 B2
(45) Date of Patent: Oct. 17, 2006

(54) STABILIZER THAT COMPENSATES FOR A GAP BETWEEN A VEHICLE WINDSHIELD AND A SECTION OF A MOISTURE SENSOR ATTACHED THERETO

(75) Inventor: Dave Peterson, East Liberty, OH (US)

(73) Assignee: Honda Motor Co., Ltd., Tokyo (JP)

( * ) Notice: Subject to any disclaimer, the term of this patent is extended or adjusted under 35 U.S.C. 154(b) by 51 days.

(21) Appl. No.: 11/039,302

(22) Filed: Jan. 20, 2005

(65) Prior Publication Data

US 2006/0156806 A1    Jul. 20, 2006

(51) Int. Cl.
*G02B 6/42* (2006.01)
*G01N 15/06* (2006.01)

(52) U.S. Cl. .................. 250/227.25; 250/574

(58) Field of Classification Search ........... 250/227.25, 250/573–577; 73/170.17; 224/482
See application file for complete search history.

(56) References Cited

U.S. PATENT DOCUMENTS

| | | |
|---|---|---|
| 4,798,956 A | 1/1989 | Hochstein |
| 4,859,867 A | 8/1989 | Larson et al. |
| 4,871,917 A | 10/1989 | O'Farrell et al. |
| 4,960,996 A | 10/1990 | Hochstein |
| 5,276,388 A | 1/1994 | Levers |
| 5,414,257 A | 5/1995 | Stanton |
| 5,808,734 A | 9/1998 | Kolari |
| 5,898,183 A | 4/1999 | Teder |
| 5,998,782 A * | 12/1999 | Koyama et al. ........ 250/227.25 |
| 6,052,196 A | 4/2000 | Pientka et al. |
| 6,207,967 B1 | 3/2001 | Hochstein |
| 6,229,613 B1 * | 5/2001 | Hog et al. .................. 356/445 |
| 6,313,457 B1 | 11/2001 | Bauer et al. |
| 2002/0040964 A1 * | 4/2002 | Dausmann et al. .... 250/227.25 |

* cited by examiner

*Primary Examiner*—Thanh X. Luu
(74) *Attorney, Agent, or Firm*—Rankin, Hill, Porter & Clark LLP; Mark Duell

(57) ABSTRACT

A stabilizer for placement between a rain or moisture sensor unit and a vehicle windshield to compensate for incongruency between the moisture sensor unit and an optical coupler located between the moisture sensor unit and the windshield. The stabilizer includes a planar section of support tape having two bonding surfaces and being resiliently compressible in a transverse direction, adhesive material affixed to both bonding surfaces and a removable release tape affixed to the first bonding surface.

13 Claims, 4 Drawing Sheets

STABILIZER THAT COMPENSATES FOR A GAP BETWEEN A VEHICLE WINDSHIELD AND A SECTION OF A MOISTURE SENSOR ATTACHED THERETO

BACKGROUND OF THE INVENTION

Modern vehicle accessories include devices such as automatic windshield wiper operating systems. These systems include a rain or moisture sensor that determines when rain or other precipitation is present on the vehicle windshield and then signals the windshield wipers directly or through the vehicle's computer to operate accordingly. The moisture sensor, typically located on the inside of the vehicle windshield, operates by sending a beam of light from an emitter, directed at an angle against the windshield, the beam being at least partially reflected to a detector. When the windshield is in a dry condition, the reflected light has parameters that differ from light reflected when the windshield is in a wet condition. To maximize efficiency, the moisture sensor unit is placed very close to the vehicle windshield. To provide a predictable optical path for the emitted and reflected light beams (apart from the desired anomalies caused by the wet windshield) an optical coupler is commonly placed between the windshield and the moisture sensor and is affixed to both.

In some instances moisture sensor units and optical couplers are incongruent. Typically, the moisture sensor unit includes additional components that are not directly associated with the transmission and reflection of light, for example, an electrical coupler used in a system for sending and receiving electrical signals and these components are not overlapped by the optical coupler. The incongruence between the moisture sensor unit and optical coupler means that there is a gap or aperture between a section of the moisture sensor unit and the vehicle windshield when the moisture sensor is in position. This gap or aperture may allow the moisture sensor unit to move in a manner not in unison with the vehicle windshield and optical coupler when either the entire vehicle is vibrated or the moisture sensor unit is jarred. This dissonant motion creates misalignment of the projected and reflected light beam causing "false positive" readings for the presence of moisture on the vehicle windshield.

What is desired is a structural stabilizer to compensate for incongruence between a moisture sensor unit and any element, such as an optical coupler, located between the moisture sensor unit and the vehicle windshield.

SUMMARY OF THE INVENTION

The present invention satisfies the need for a structural stabilizer that negates the potential disruption caused by incongruency between a moisture sensor unit and other elements located between the moisture sensor unit and a vehicle windshield. In a preferred embodiment of the invention a stabilizer for placement between a moisture sensor unit and a vehicle windshield is provided. The stabilizer includes a planar section of support tape having a first bonding surface and a second bonding surface and being resiliently compressible in a transverse direction as well as adhesive material affixed to both the first bonding surface and second bonding surface of the planar section of support tape and a removable release tape affixed to the first bonding surface.

The release tape is preferably sized larger than the section of support tape and is configured with a fold between two integral sections, one folded over upon the other. As the moisture sensor unit is put into place with one support tape bonding surface affixed to the unit, the section of support tape becomes inaccessible between the moisture sensor unit and windshield, but the release tape extends outside of the perimeter of the moisture sensor unit. As a result the release tape may be gripped and pulled, easily detaching from the support tape due to the fold between the two portions. Once removed the other bonding surface on the support tape is exposed and is affixable to the windshield.

These and other aspects of the invention are herein described in particularized detail with reference to the accompanying figures.

DETAILED DESCRIPTION OF THE INVENTION

Figure 1:
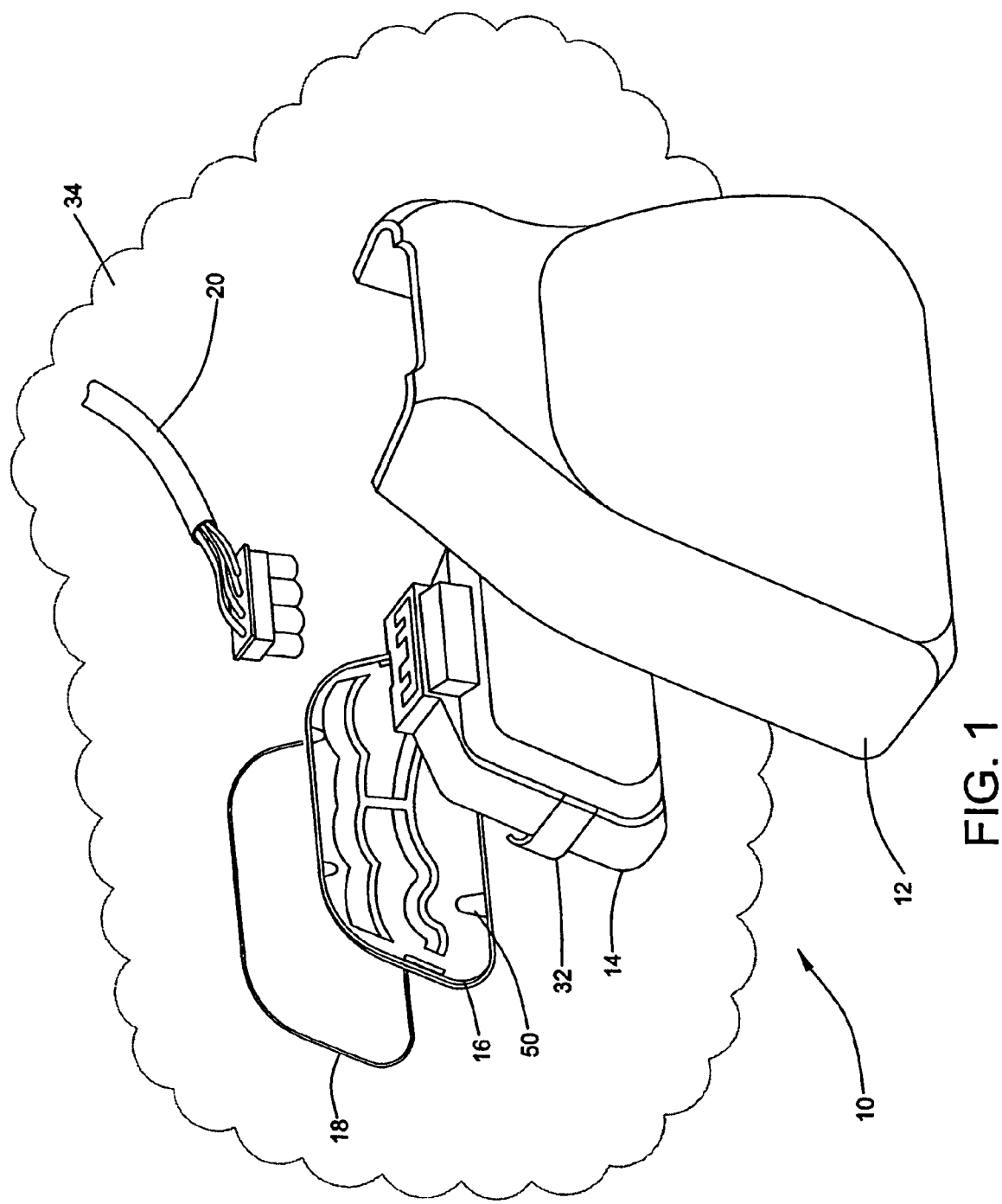
FIG. 1 is an exploded view of a moisture sensing system.
Figure 4:
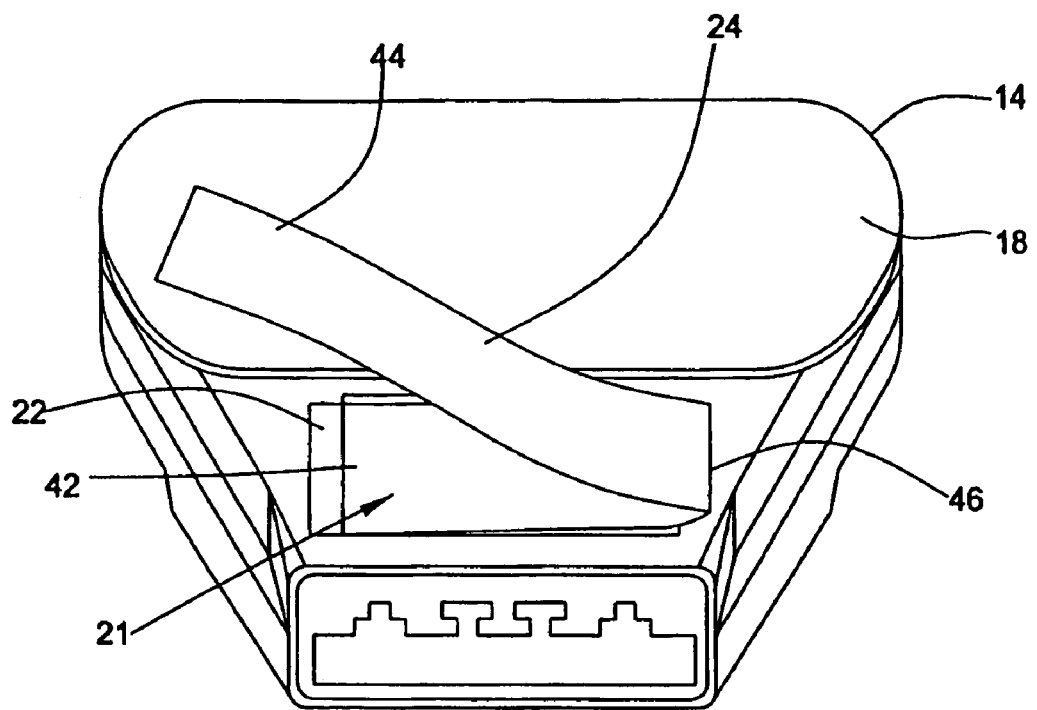
FIG. 4 is a perspective view of a moisture sensor unit with support tape and release tape.
Figure 6:
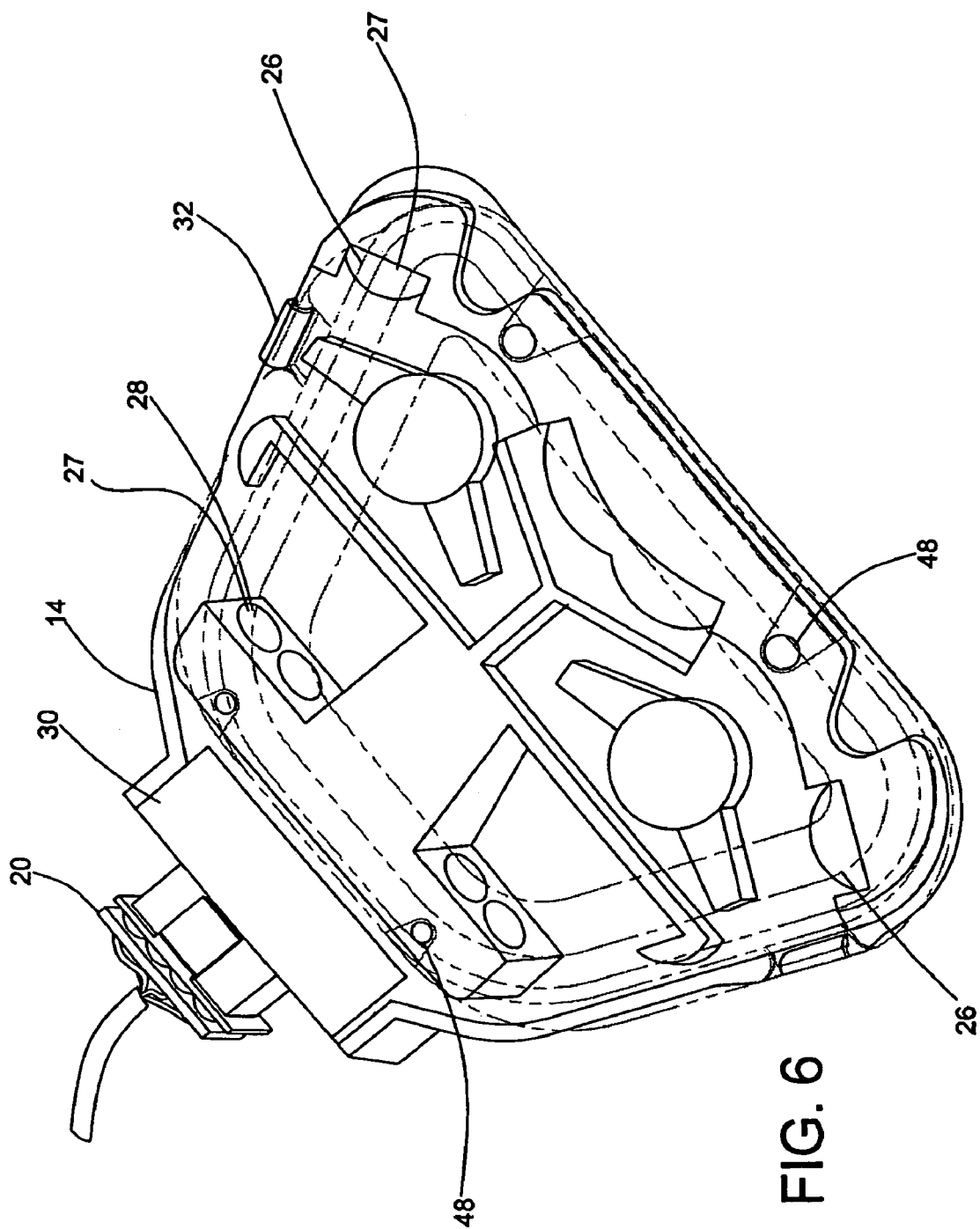
FIG. 6 is a perspective view of a moisture sensor unit and optical sensor (phantom) assembled.

FIG. 1 shows a moisture sensor system 10 including a styling cover 12, moisture sensor unit 14, optical coupler 16, optical coupler adhesive 18 and electrical coupler 20. FIG. 4 additionally shows a stabilizer 21 including a section of support tape 22 and release tape 24, the support tape 22 affixed to the moisture sensor unit 14. Referring back to FIG. 1, the styling cover 12 is hollow, has a generally triangular shape and fits over the moisture sensor unit 14, and optical coupler 16. The moisture sensor unit 14 also has a generally triangular shape. Referring to FIG. 6, the moisture sensor unit 14 includes a plurality of light emitters 26, lenses 27, detectors 28, pins 48 and an electrical coupler 20. The electrical coupler 20 is located at one of the sensing unit's three corners and the pins 48 are generally located around the sensing unit's perimeter. The light emitters 26 are located between the two remaining corners. The detectors 28 are located generally parallel to the light emitters 26 and generally near the middle of the sensor unit 14. The light emitters 26 and detectors 28 are affixed to lenses 27 to focus transmitted and reflected light. Preferably, multiple light emitters 26 and detectors 28 are used. The area of the moisture sensor unit 14 adjacent to the electrical coupler 20 is considered the position of incongruence 30 and contributes to causing false positive readings within the moisture sensor unit 14. Referring back to FIG. 1, the optical coupler 16 is a generally trapezoidal cover fitting over a section of the moisture sensor unit 14. The optical coupler 16 is affixed to the moisture sensor unit 14 using two spring clips 32. The optical coupler 16 includes a number of slots 50 around its perimeter that mate with the pins 48 on the moisture sensor unit 14 for alignment purposes. The optical coupler 16 is placed between the moisture sensor unit 14 and vehicle windshield 34 and is affixed to the vehicle windshield 34 using a section of adhesive 18.

Figure 2:
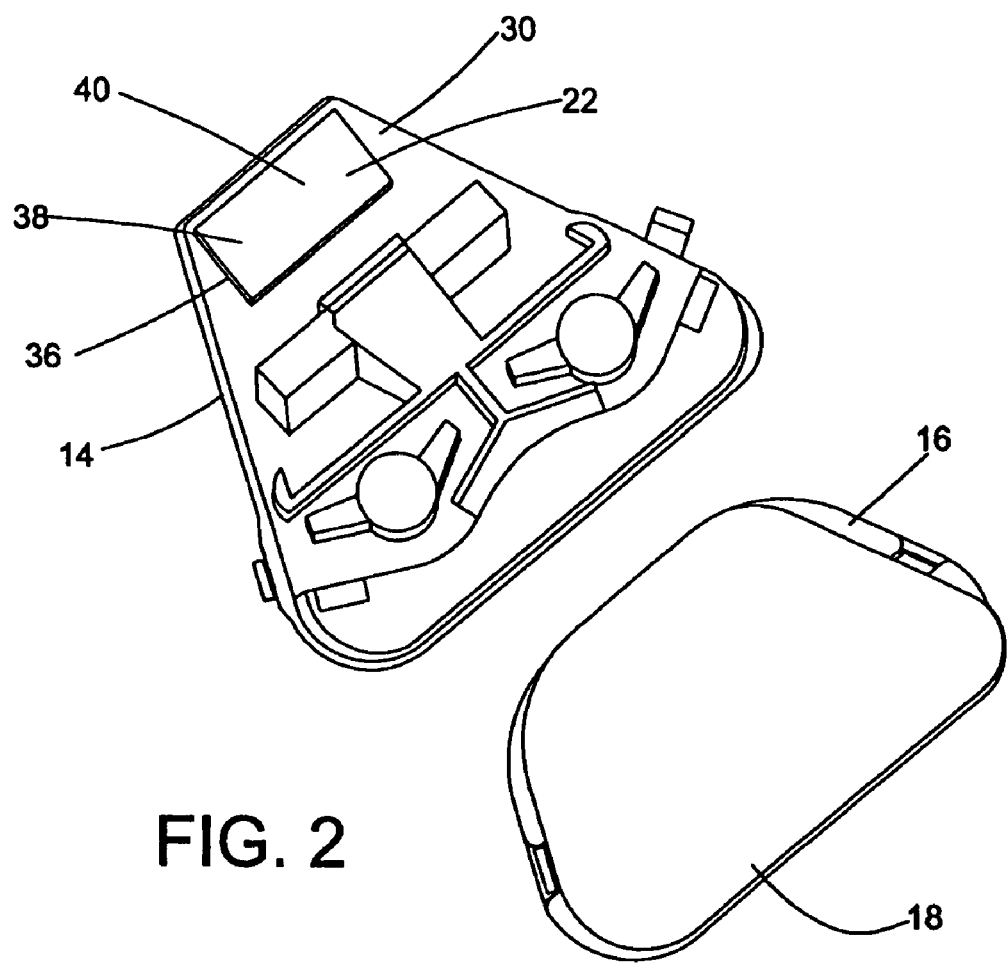
FIG. 2 is a top view of a moisture sensor unit and optical coupler, disassembled.
Figure 3:
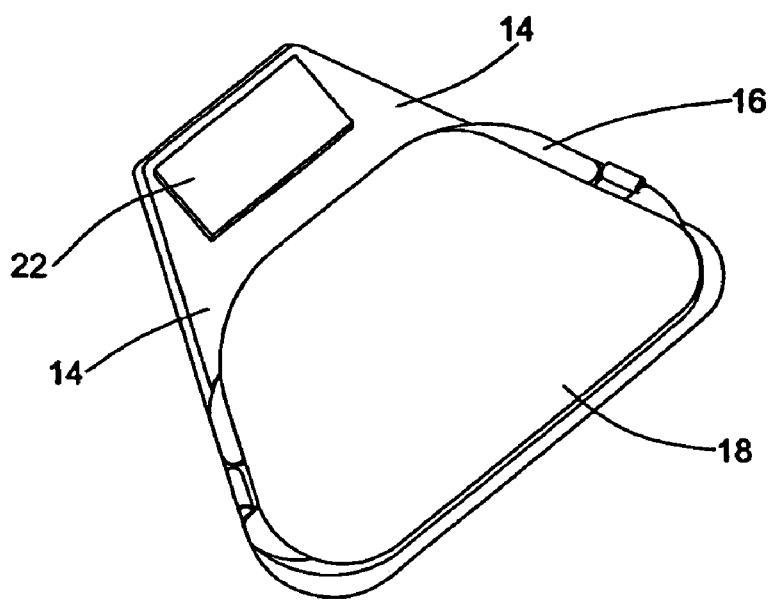
FIG. 3 is a top view of a moisture sensor unit and optical coupler, assembled.
Figure 5:
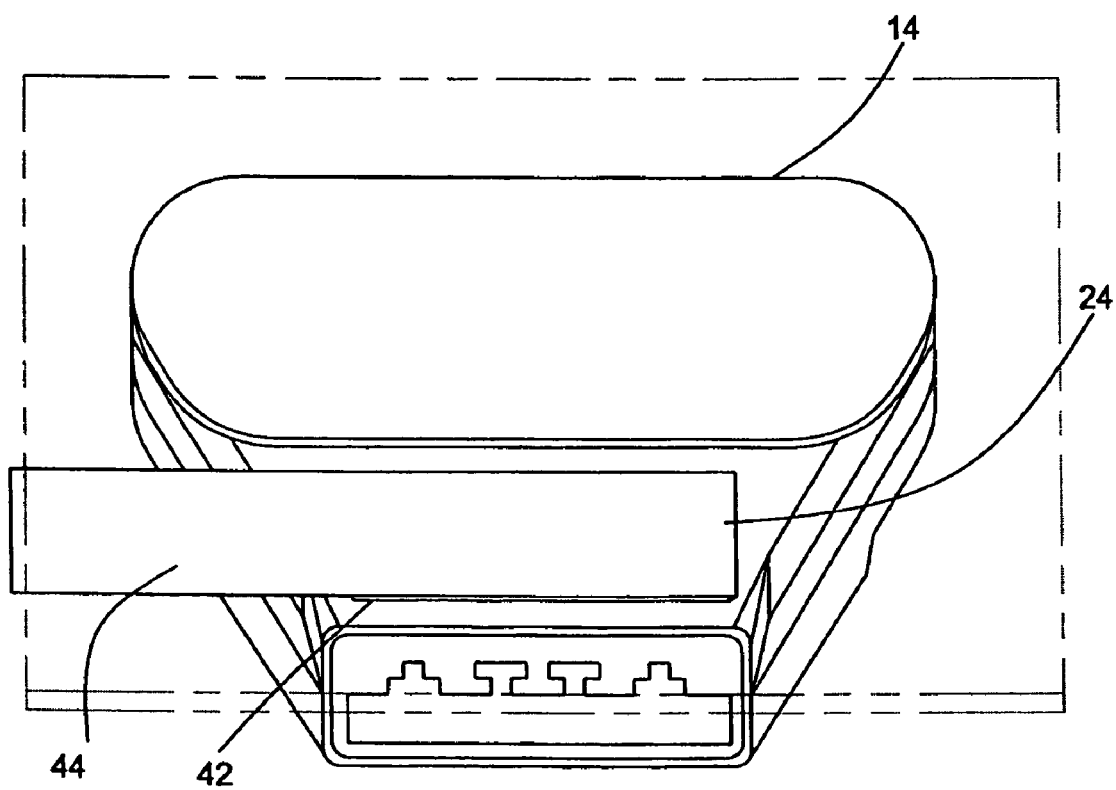
FIG. 5 is a perspective view of a moisture sensor unit showing a release tape removal step.

As shown in FIGS. 2 and 3, a planar section of support tape 22 is affixed to the moisture sensor unit 14 in the position of incongruence 30. The support tape 22 is generally rectangular and planar. Additionally, the support tape 22 is resiliently compressible in a direction transverse to the general plane of the tape. The support tape is preferably a foam tape and defines a first bonding surface 36 and a second bonding surface 38. The bonding surfaces 36 and 38 are coated with an adhesive 40. The first bonding surface 36 is bonded to the moisture sensor unit 14 while the second bonding surface 38 is initially covered with the removable release tape 24, as shown in FIGS. 4 and 5. The support tape 22 has a thickness that is generally equivalent to the thickness of the optical coupler 16 and adhesive 18 so as to support the moisture sensor unit 14 when subsequently bonded to the windshield 34.

The removable release tape 24 is secured to the second bonding surface 38 of the planar section of support tape 22. The removable release tape 24 is rectangular having a width that is generally equivalent to the width of the support tape 22 and does not include any adhesive material upon its surfaces. The length of the release tape 24 exceeds that of the support tape 22. Preferably, the release tape 24 is folded into two integral portions 42 and 44 of differing lengths. The first portion 42 is affixed to the support tape 22 and the second portion 44 is folded back across the first portion 42 and extends past the end of the first portion 42 and the perimeter of the moisture sensor unit 14.

Referring back to FIGS. 1, 4 and 6, the styling cover 12 protects the moisture sensor unit 14 and optical coupler 16 from damage by contact. The styling cover 12 also is decorative and may match the color, texture, etc. of other components of the vehicle interior. The moisture sensor unit 14 uses an emitted and reflected light beam to sense moisture on the surface of the vehicle's windshield 34. Lenses 27 focus the emitted and reflected light beams. The moisture sensor unit 14 sends an electrical signal, via the electrical coupler 20 to the vehicles' windshield wiper control system. The optical coupler 16 provides a consistent optical path for the emission and return of light beams generated by the moisture sensor unit 14.

The planar section of support tape 22 in the stabilizer 21 acts as a gap filler and structural support between the vehicle windshield 34 and the moisture sensor unit 14. By filling this gap the moisture sensor unit 14 is less likely to move in a manner that is not in unison with the windshield 34 and the optical coupler 16. Because the support tape 22 is resiliently compressible, it acts as a good vibration damper. The release tape 24 acts as a temporary barrier between the adhesive on the support tape 22 and the vehicle windshield 34 so as to permit placement of the moisture sensor unit on the windshield without premature adhesive bonding thereof.

The optical coupler 16 is affixed to the vehicle windshield 34 via the adhesive layer 18 and clipped to the moisture sensor unit 14 via the clips 32. Alternatively, the optical coupler 16 may be clipped to the moisture sensor unit 14 prior to affixation of the optical coupler 16 to the vehicle windshield 34. The section of support tape 22 is affixed to the moisture sensor unit 14 in a position incongruent with the optical coupler 16. During initial assembly of the optical coupler 16 and moisture sensor unit 14, the release tape 24 is left in place on the support tape 22. After the moisture sensor unit 14 is clipped to the optical coupler 16, the release tape 24 is pulled off, from an end opposite the fold 46, to expose the second bonding surface 38 of the support tape 22. Because the second portion 44 of the release tape is being pulled directly over the first portion 42 of release tape, removal from the adhesive surface of the support tape 22 is simple.

In operation, the moisture sensor unit 14 projects a light beam through the optical coupler 16 and windshield 34 and further detects at least a portion of the reflected beam, the reflected beam having different parameters if the windshield 34 is wet or dry.

The support tape does not need to be foam, but can be any cushioned pad. The moisture sensor unit may be any type, not necessarily a light beam emitter/detector system. The system preferably is used on a vehicle windshield, but may be used anywhere moisture is to be sensed on a transparent surface. Different shapes of support tape may be used, such as a shape that is virtually identical to the shape of the position of incongruence.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A stabilizer for placement between a moisture sensor unit and a vehicle windshield, the moisture sensor unit including a plurality of light emitters and detectors covered by an optical coupler and also including a position of incongruence adjacent to, but not including, the light emitters, detectors or optical coupler, the stabilizer comprising:
   a planar section of support tape having a first bonding surface and a second bonding surface, said first surface being attachable to the position of incongruence on the moisture sensor unit, said support tape being resiliently compressible in a direction transverse to a length of the support tape;
   adhesive material affixed to both the first bonding surface and second bonding surface of the support tape; and
   a removable release tape affixed to the second bonding surface wherein said release tape is removed to permit adhesive affixation of said moisture sensor unit to said vehicle windshield, wherein the stabilizer fills a gap between the moisture sensor unit and windshield in the position of incongruence caused by the thickness of the adjacent optical coupler.

2. The stabilizer of claim 1, wherein the removable release tape has a length greater than the length of the planar section of support tape whereby the release tape is accessible when the stabilizer is in place between the vehicle windshield and moisture sensor unit.

3. The stabilizer of claim 2, wherein the removable release tape is configured with a first portion extending along and affixed to the second bonding surface and an integral section portion is folded back over the first portion and wherein the length of the second portion exceeds the length of the first portion.

4. The stabilizer of claim 1, wherein the support tape has a thickness generally equivalent to the thickness of the optical coupler.

5. The stabilizer of claim 1, wherein the stabilizer is manufactured from foam tape.

6. The stabilizer of claim 1, wherein the stabilizer has a generally triangular shape and the position on incongruence is adjacent to one apex of the triangle.

7. The stabilizer of claim 6, wherein the stabilizer includes an electrical coupler on the triangle of the stabilizer adjacent to the position of incongruence.

8. A method of assembling a moisture sensor upon a vehicle windshield comprising the steps of:

affixing an optical coupler to a vehicle windshield;

affixing a stabilizer comprising a planar section of support tape to a position of incongruence on a moisture sensor unit comprising a first portion including light emitters and detectors, the first section being aligned with the optical coupler when the moisture sensor and optical coupler are affixed together and the position of incongruence located between the first portion and a peripheral edge of the moisture sensor such that the position of incongruence is not aligned with the optical coupler when the moisture sensor unit and optical coupler are affixed together; and affixing the moisture sensor unit to the optical coupler, wherein the stabilizer fills a gap between the windshield and moisture sensor at the position of incongruence created by the thickness of the adjacent optical coupler.

9. The method of claim 8, further comprising the step of removing a release tape affixed to the support tape after the optical coupler is affixed to the vehicle windshield and the moisture sensor is affixed to the optical coupler so as to permit adhesive securement between said support tape and said windshield.

10. The method of claim 8, wherein the optical coupler is attached to the windshield using an adhesive.

11. The method of claim 8, wherein the optical coupler includes a number of slots around its perimeter that mate with pins on the moisture sensor unit.

12. The method of claim 8, further including the step of sending a light beam from one of the light emitters to one of the light detects via reflection off the windshield and wherein the light beam does not pass through the stabilizer.

13. The method of claim 8, wherein the optical coupler is affixed to the moisture sensor with clips.

\* \* \* \* \*